(12) United States Patent
Romagnoli (10) Patent No.: US 6,283,843 B1
(45) Date of Patent: *Sep. 4, 2001

(54) ABRADING BLADE

(76) Inventor: Brian A. Romagnoli, 315 Francis Dr., Havertown, PA (US) 19083

( * ) Notice: Subject to any disclaimer, the term of this patent is extended or adjusted under 35 U.S.C. 154(b) by 0 days.

This patent is subject to a terminal disclaimer.

(21) Appl. No.: 09/629,239

(22) Filed: Jul. 31, 2000

Related U.S. Application Data (63) Continuation-in-part of application No. 09/261,037, filed on Mar. 2, 1999, now Pat. No. 6,149,510.
(60) Provisional application No. 60/146,506, filed on Jul. 30, 1999.

(51) Int. Cl.[7] .................................................. B24D 15/00
(52) U.S. Cl. ........................................... 451/523; 451/524
(58) Field of Search ..................................... 451/356, 523, 451/524, 525; 30/349, 357, 392; 125/12, 22; 83/697, 750

(56) References Cited

U.S. PATENT DOCUMENTS

| | | | |
|---|---|---|---|
| D. 313,733 | 1/1991 | Pastore | D8/61 |
| D. 323,100 | 1/1992 | Pastore | D8/70 |
| 2,736,351 | 2/1956 | Baker | 143/60 |
| 2,869,311 | * 1/1959 | Beeston, Jr. | 30/349 |
| 3,111,970 | 11/1963 | Priest et al. | 30/357 X |
| 3,553,905 | 1/1971 | Lemelson | 30/357 X |
| 3,630,699 | 12/1971 | Catlin | 451/356 X |
| 3,946,778 | * 3/1976 | Knuth | 30/349 |
| 3,977,289 | 8/1976 | Tuke | 30/392 X |
| 4,064,588 | 12/1977 | Cooper | 15/236 R |
| 4,083,112 | 4/1978 | Palm | 30/392 X |
| 4,090,297 | 5/1978 | Wanner | 30/124 |
| 4,128,970 | 12/1978 | Sawrenko | 51/170 TL |
| 4,155,142 | 5/1979 | Demetriadis | 15/236 C |
| 4,156,966 | 6/1979 | Eubank | 30/166 R |
| 4,338,718 | 7/1982 | Olkkola | 30/171 |
| 4,435,923 | 3/1984 | Regina | 51/170 TL |
| 4,481,689 | 11/1984 | Westmoreland | 15/236 R |
| 4,739,557 | 4/1988 | Wagner | 30/392 |
| 4,953,301 | 9/1990 | Dobbs, Jr. | 30/392 |
| 4,984,369 | 1/1991 | Flint et al. | 30/374 |
| 5,209,022 | 5/1993 | McCambridge | 51/181 R |
| 5,596,810 | 1/1997 | Neubert et al. | 30/392 X |
| 5,651,727 | 7/1997 | Weinstein et al. | 451/344 |
| 5,692,308 | 12/1997 | Di Liero | 30/357 X |
| 5,839,949 | * 11/1998 | Martin et al. | 451/356 |
| 5,851,141 | 12/1998 | Elmore | 451/357 |
| 6,149,150 | 11/2000 | Romagnoli | 451/356 |

OTHER PUBLICATIONS

GroutGrabber, D.I.Y. Grout Grabber–Introduced at National Hardware Show 2000, 4 pgs. excerpted from a website at URL http:/www.groutgrabber.com/(printed–Dec. 12, 2000–Dec. 13, 2000).

National Hardware Show, 5 pgs. excerpted from a website at URL http://www.nationalhardwareshow.com (printed–Dec. 13, 2000).

* cited by examiner

*Primary Examiner*—Derris H. Banks
(74) *Attorney, Agent, or Firm*—Synnestvedt & Lechner LLP (57) ABSTRACT

An abrading blade assembly having a detachable cutting section. The abrading blade assembly includes a body having a shank portion configured for attachment to a conventional reciprocating saw and a removably attachable cutting section having a cutting edge extending along its lower end. The cutting edge is oriented to be substantially parallel to a line of reciprocation defined by the reciprocal motion of the saw's reciprocating spindle. The blade assembly's cutting edge is spaced from the line of reciprocation a distance sufficient to permit clearance of the saw with the work surface while the blade is being used to abrade in a direction substantially parallel to the line of reciprocation along the work surface.

20 Claims, 7 Drawing Sheets

ABRADING BLADE

RELATED APPLICATIONS

This application is a continuation-in-part of U.S. application Ser. No. 09/261,037 filed Mar. 2, 1999, now U.S. Pat. No. 6,149,510, and this application claims the benefit of U.S. Provisional Patent Application No. 60/146,506 filed Jul. 30, 1999. U.S. application Ser. Nos. 09/261,037 and 60/146,506 are hereby incorporated by reference.

FIELD OF THE INVENTION

This invention relates generally to an abrading blade, and more particularly to an abrading blade used with a reciprocating saw for removing grout between neighboring tiles in a tiled surface.

BACKGROUND OF THE INVENTION

To repair or reconstruct tiled surfaces, such as bathroom or kitchen walls or floors, old cementitious material (i.e., grout) must be removed and replaced. Such grout is sometimes removed by chipping, cutting or abrading the grout with a hand tool not specifically designed for the task. Alternatively, the grout may be removed using hand tools specifically designed for grout abrasion, such as those disclosed in U.S. Pat. Nos. 4,064,588 to Cooper, U.S. Pat. No. 4,155,142 to Demetriadis, U.S. Pat. No. 4,156,966 to Eubank and U.S. Pat. No. 4,338,718 to Olkkola. These tools are generally manually reciprocated along the grouted surface with sufficient pressure to abrade and remove the grout. Some of these tools are designed more for minor abrasion, as for cleaning grout, than for complete removal of grout. In either case, a considerable amount of manual labor is required.

Accordingly, power tools have been developed which are specifically designed for the sole purpose of grout removal. Such tools are disclosed, for example, in U.S. Pat. No. 4,435,923 to Regina and U.S. Pat. No. 5,651,727 to Weinstein et al. However, such tools are typically too expensive to be suitable for purchase by a homeowner or other person performing grout removal only occasionally.

Accordingly, it is an object of the present invention to provide an abrading blade suitable for the removal of grout. It is another object to provide an abrading blade which may be used with a conventional multipurpose powerable saw. It is yet another object of the present invention to provide an abrading blade which removes grout by reciprocation along a grout surface. It is a further object to provide an abrading blade which affords control and stability during high-speed reciprocation. It is a still further object to provide an abrading blade with a replaceable cutting section. It is yet a further object to provide such a blade which is of sturdy construction and is inexpensive to manufacture.

SUMMARY OF THE INVENTION

In broad terms, the invention provides a blade for cutting a work surface and which is attachable to a reciprocating saw having a spindle reciprocable along a line of reciprocation. The blade includes a rigid body having a lower end. The blade also has a shank portion extending rearwardly from the body and which is configured for attachment to the spindle of the saw for reciprocation therewith. A cutting edge extends along the lower end of the blade for engaging the work surface. The cutting edge is spaced perpendicularly from the line of reciprocation a distance sufficient to permit clearance of the saw from the work surface when the shank is attached to the spindle and the cutting edge engages the work surface such that the line of reciprocation is parallel to the work surface. Reciprocating saws, such as those marketed under the trademark Sawzall®, use the blade to cut in a direction perpendicular to the line of reciprocation which is also substantially perpendicular to the cutting edge of the blade. With the present invention however, the blade can be moved in a direction parallel with the work surface as it cuts. The present invention allows the use of such novel blades with existing reciprocating saws to cut work surfaces such as tile grout which before could not be done.

In one embodiment of the present invention, the abrading blade includes a blade holder and a detachable blade.

DESCRIPTION OF THE DRAWINGS

FIG. 1 is an elevational view of a blade in accordance with the present invention for abrading grout adjacent inlay tiles showing a shank adapted for inverted attachment to a Milwaukee® Sawzall® reciprocating saw or the like;

FIG. 10 is an elevational view of a blade holder in accordance with the present invention for abrading grout between tiles showing a shank adapted for inverted attachment to a Milwaukee® Sawzall® reciprocating saw or the like;

DETAILED DESCRIPTION

The present invention relates to an abrading blade. While it is contemplated that such an abrading blade may be used for a variety of abrasion purposes, the abrading blade disclosed is particularly useful for removing grout between neighboring tiles in a tiled surface.

Figure 1:
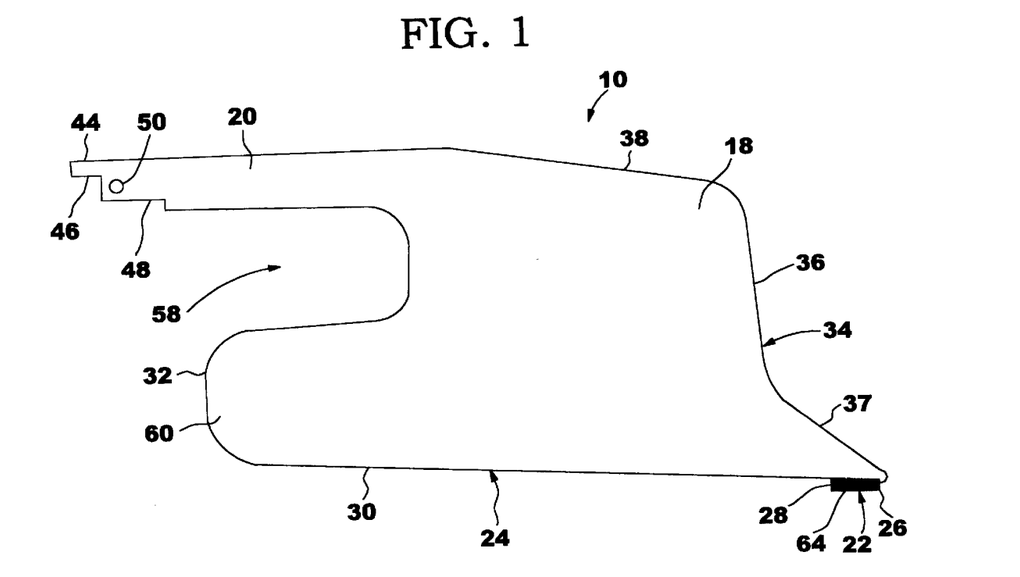
Figure 5:
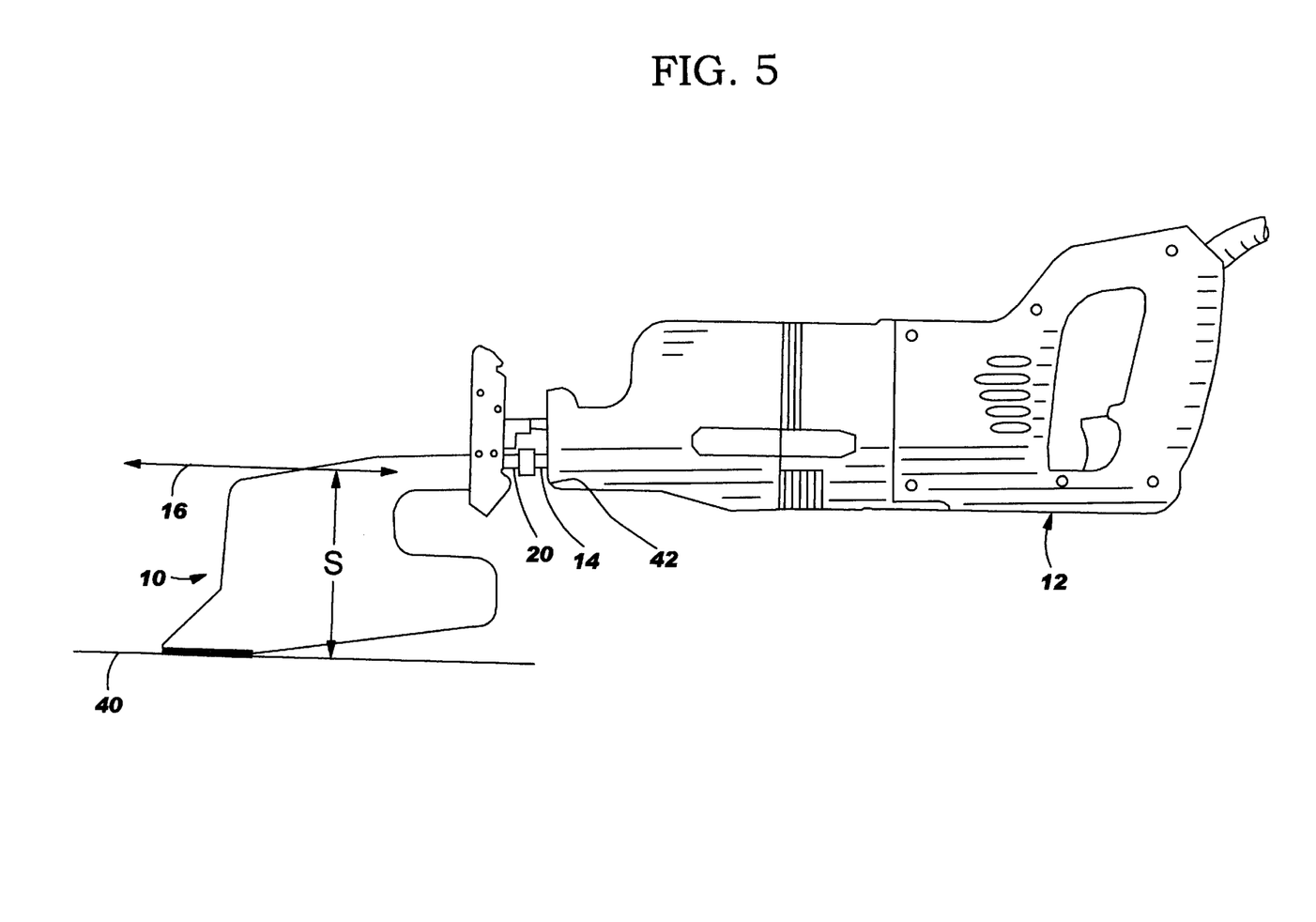
FIG. 5 is a plan view of a saw having a blade in accordance with the present invention, the saw being in an inverted position.

Illustrated in FIGS. 1 and 5 is an abrading blade 10 in accordance with the present invention for attachment to a reciprocating saw 12 having a spindle 14 which is reciprocable along a line of reciprocation 16, the line of reciprocation 16 being generally defined by the reciprocal motion of the spindle 14. Examples of such saws 12 include saws sold under the trademark Milwaukee® Sawzall® and Bosch Saber Plus™ and those commonly known as jigsaws or saber saws.

The blade 10 comprises a rigid body 18, a shank portion 20 extending rearwardly from the body, and a cutting edge 22 extending along a lower end 24 of the body 18 (abrasive granules 64 being shown on the cutting edge which integrally extend from the body 18). The cutting edge 22 has a leading end 26 and a trailing end 28 The lower end 24 also includes a trailing edge 30 extending from the trailing end 28 of the cutting edge 22 to a rear end 32. At a front end 34 of the blade is a forward edge 36 extending from the leading end 26 to a top end 38 which in turn extends to the shank portion 20. The shank portion 20 is configured for attachment to the spindle 14 of the reciprocating saw 12 for reciprocation therewith. The cutting edge 22 is oriented to be substantially parallel to the line of reciprocation 16 when the blade is attached to the saw 12. Furthermore, the cutting edge 22 is spaced perpendicularly from the line of reciprocation 16 a sufficient distance S to permit clearance of the saw 12 with a work surface 40, i.e., there being clearance between the lowest point 42 of the saw 12 and the work surface 40 when the cutting edge 22 engages the work surface 40 and the line of reciprocation 16 is parallel to the work surface 40 as shown in FIG. 5.

The shank portion 20 of FIG. 1 is configured for attachment to the spindle 14 of a reciprocating saw 12 of the type sold under the trademark Milwaukee® Sawzall®. However, as discussed further below, a blade 10 may be provided having a shank 20 adapted for use with a variety of conventional multipurpose powerable saws. The shank portion 20 shown in FIG. 1 has a rearwardly extending offset tab 44 and defines notches 46 and 48 and a hole 50 specific for the Sawzall®. In the preferred embodiment, the shank portion 20 is configured for attachment to the saw 12 in an inverted position, as shown in FIG. 5, to provide additional clearance between the saw 12 and the work surface 40 when the blade is in use.

Figure 2:
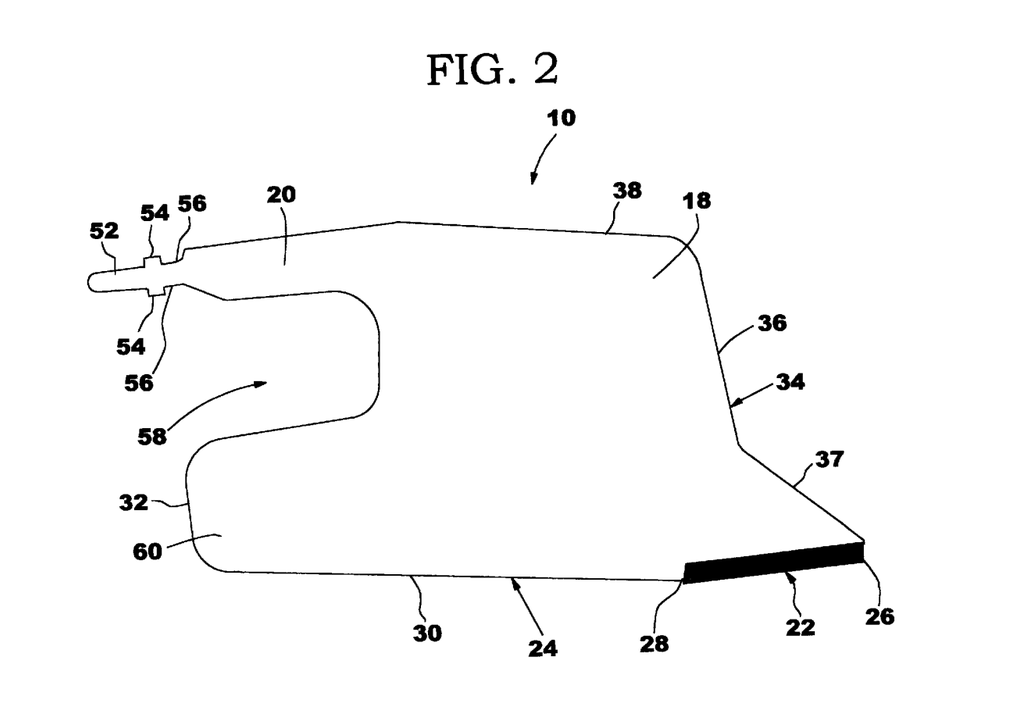
FIG. 2 is an elevational view of a blade in accordance with the present invention for abrading grout between tiles showing a shank adapted for inverted attachment to a Bosch Sabre Plus™ reciprocating saw.
Figure 3:
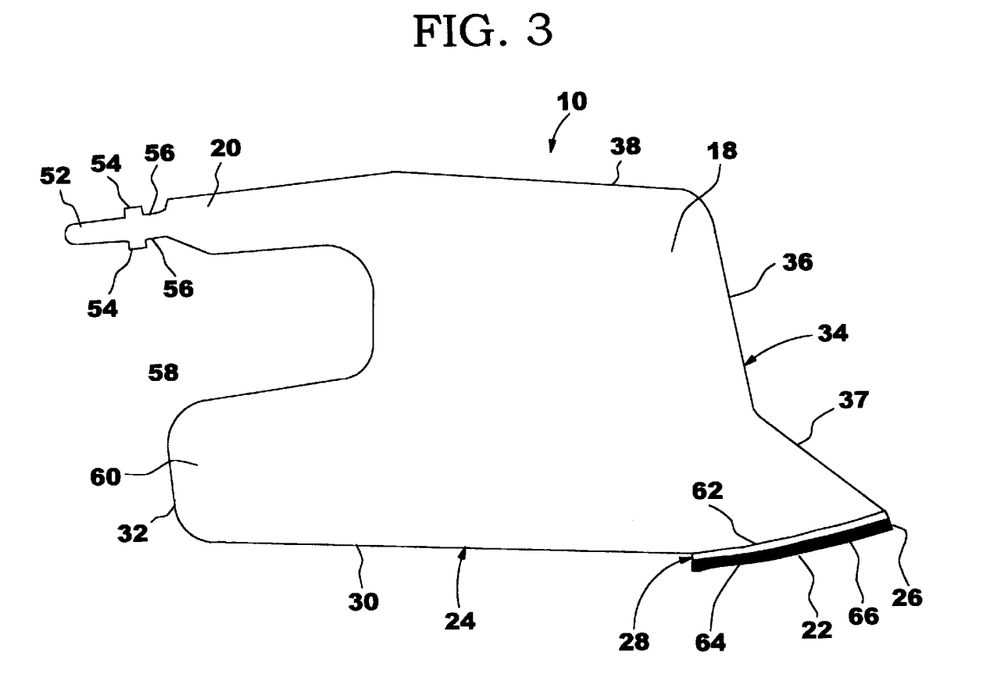
FIG. 3 is an elevational view of a blade in accordance with the present invention having a shoe for abrading a wide bead of grout and showing a shank adapted for inverted attachment to a Bosch Sabre Plus™ reciprocating saw.
Figure 6:
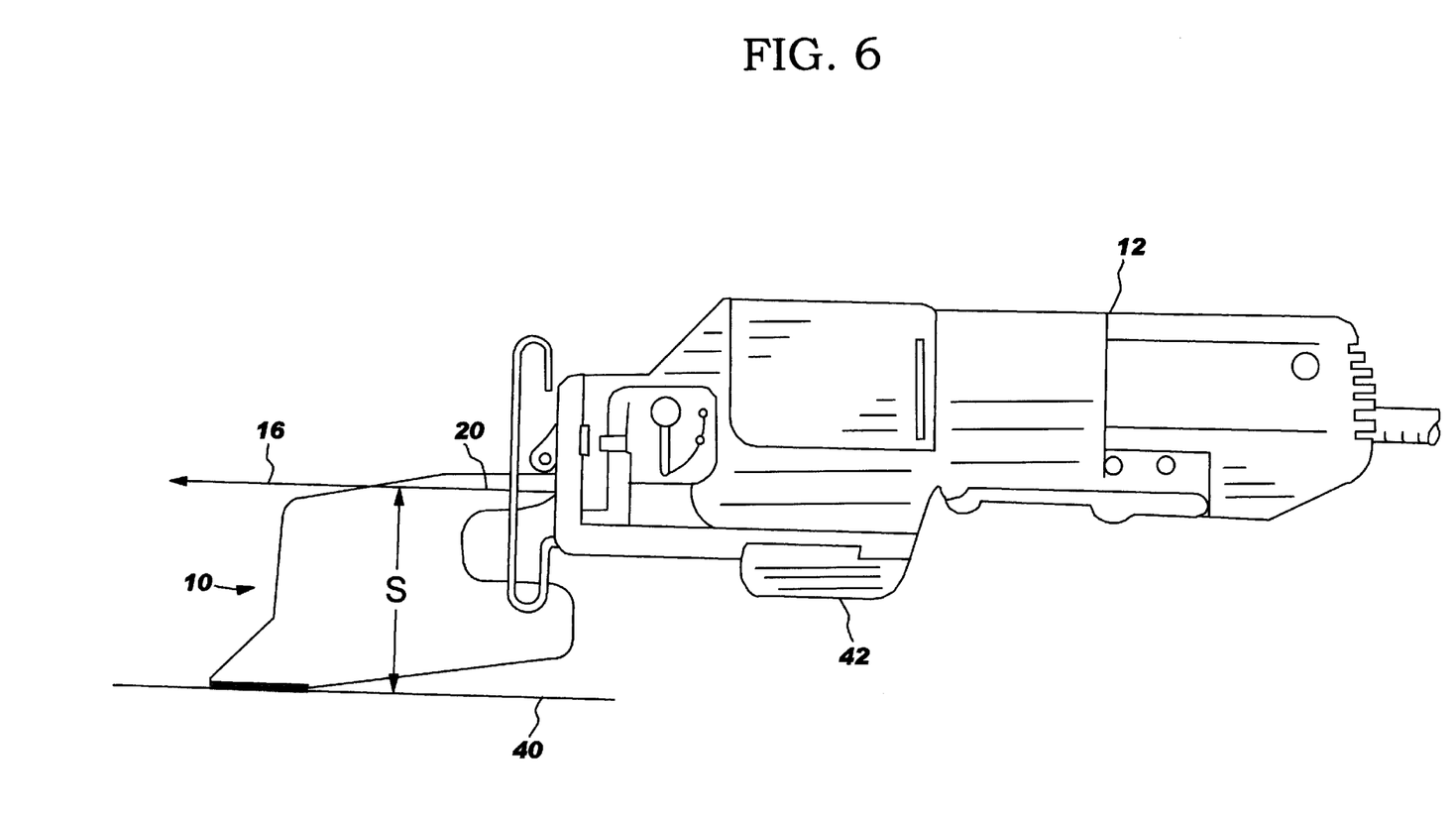
FIG. 6 is a plan view of a blade in accordance with the present invention shown attached to another type of saw.
Figure 7:
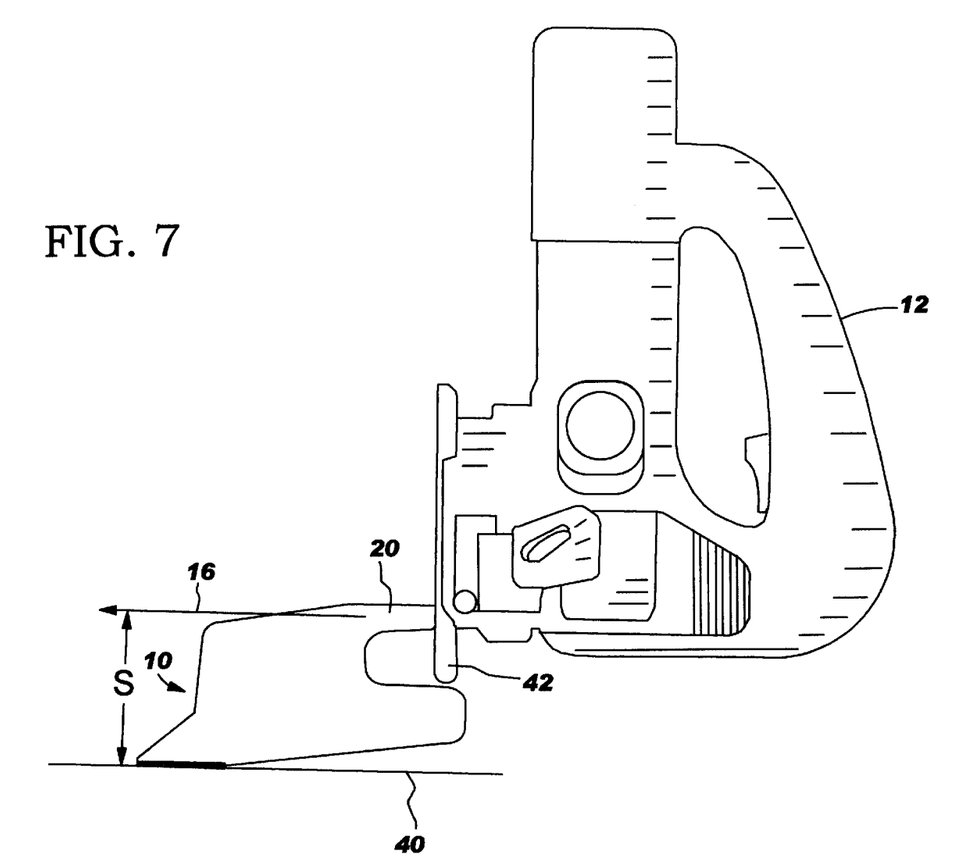
FIG. 7 is a plan view of a blade in accordance with the present invention shown attached to a jig saw.

Illustrated in FIGS. 2 and 3 are alternate embodiments having a shank portion 20 configured for attachment to a reciprocating saw of the type sold under the trademark Bosch Sabre Plus®. Here, the shank portion 20 comprises a rearwardly extending central tab 52 and a pair of opposed shoulders 54 extending laterally from the tab 52 and defining a pair of notches 56. Preferably, the shank portion 20 is configured for attachment to the saw in an inverted position, as described above. See FIG. 6. In another alternate embodiment, FIG. 4, the shank portion 20 is configured for attachment to a jigsaw or saber saw as shown in FIG. 7.

Returning to FIG. 1, the rear end 32 is preferably contoured to provide a clearance notch 58 and a rearwardly extending stabilizing leg 60 adjacent the clearance notch 58 as shown in FIGS. 1–3. The rear end 32 is contoured to provide a clearance notch 58 of sufficient height and depth to prevent interference of the blade 10 with any part of the reciprocating saw 12 when the spindle 14 is reciprocated, the height being determined by the structure of the saw and the depth being determined by the stroke length of the saw's spindle. The stabilizing leg 60 extends rearwardly of the body and is believed to enhance stability of the blade 10 when reciprocated at the high speeds associated with reciprocating saws of this type.

The forward edge 36 recedes from the leading end 26 of the cutting edge 22. The receding forward edge 36 provides clearance of the blade 10 with any surface that may abut the work surface 40 during reciprocation of the blade, e.g., to prevent collision of the blade 10 with a wall when abrading grout adjacent the wall on a tiled floor. While the forward edge 36 may recede from the leading end 26 in any suitable manner, it is preferable that the forward edge 36 have a portion 37 adjacent the leading end 26 which is substantially straight and which forms an acute angle with the cutting edge 22, as shown in FIGS. 1–4. Such an arrangement provides clearance of the blade 10 with an abutting surface through a broader range of orientations of the blade relative to the abutting surface.

Just as the configuration of the shank portion 20 of the blade 10 may depend upon the saw with which it is intended to be used, other aspects of the blade 10 may vary depending upon its intended use. As shown in FIG. 1, the cutting edge 22 extends below the trailing edge 30, put another way, is spaced from the trailing edge 30. This allows the trailing edge 30 sufficient clearance over neighboring tiles when the cutting edge 22 is cutting. In this embodiment, the length of the cutting edge 22 is preferably short, i.e., preferably less than one inch in length from the leading end 26 to the trailing end 28, and more preferably approximately 0.375 inches in length. Also in this embodiment, the cutting edge 22 is preferably substantially straight and substantially parallel with the line of reciprocation 16. The short length of the cutting edge 22 is conducive to abrading and removing grout adjacent small inlay tiles. Such inlay tiles are usually one inch square. However, a reciprocating saw 12 having a short stroke should also be used to prevent collision of the abrading blade with tiles adjacent an inlay tile and the resulting damage which would otherwise occur. For example, for abrasion adjacent one inch square inlay tiles, a saw having a stroke of less than one inch should be used. Additionally, the combined length of the stroke of the reciprocating saw and the length of the cutting edge 22 should be no more than one inch to prevent such collisions and damage.

In the embodiment of FIG. 2, the trailing edge 30 extends from the trailing end 28 of the cutting edge 22 and is inclined relative thereto. The length of the cutting edge 22 is preferably greater than one inch in length from the leading end 26 to the trailing end 28 and most preferably approximately 1.25 inches in length. This embodiment is particularly useful for abrading and removing grout adjacent mid-sized tiles. Such tiles are usually between four and eight inches square. The length of the cutting edge 22 and the configuration of the trailing edge 30 of the lower end 24 relative to the cutting edge 22 are conducive to abrasion along lines of grout formed by aligned tiles and for lines of grout which do not intersect other tiles, as with inlay tiles. In such an arrangement, the length of the stroke of the reciprocating saw is not critical.

In the embodiment of FIG. 3 the blade 10 has a trailing edge 30 which extends from the trailing end 28 of the cutting edge 22 and is inclined relative thereto as in FIG. 2. In this embodiment, however, the cutting edge 22 is formed on a shoe 62 fixed to the lower end 24 of the blade. The shoe 62 has a width greater than that of the body 18 of the blade 10 to permit abrasion of a wider area of grout between widely spaced tiles. Additionally, the shoe 62 is preferably upturned adjacent the leading end 26 of the cutting edge 22 to prevent an angular collision of the leading end 26 with the grout and to facilitate abrasion along the grout surface. The length of the cutting edge 22 is relatively long, i.e., preferably greater than one inch in length from the leading end 26 to the trailing end 28, and most preferably approximately 1.5 inches in length. The shoe 62 is particularly useful for abrading and removing grout adjacent widely spaced tiles. Large tiles, typically between twelve and twenty-four inches square, are commonly set in a widely spaced arrangement. Such a blade is also useful for abrasion of mortar between adjacent bricks and for general purpose abrasion. In such an arrangement, the length of the stroke of the reciprocating saw is not critical.

Figure 4:
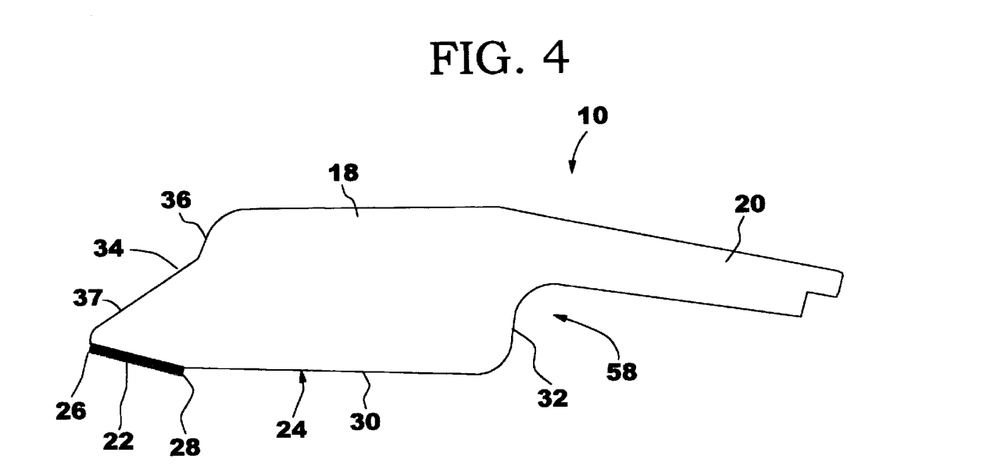
FIG. 4 is an elevational view of a blade in accordance with the present invention showing a body and shank adapted for attachment to a jigsaw.

The embodiment of FIG. 4 is adapted for attachment to a jigsaw or saber saw. The blade 10 has a trailing edge 30 which extends from the cutting edge 22 and is inclined relative thereto. The length of the cutting edge 22 is preferably greater than one inch in length, and most preferably about 1.25 inches in length. This embodiment is particularly useful for abrading and removing grout adjacent mid-sized tiles. The length of the cutting edge 22 and the configuration of the cutting edge 22 relative to the trailing edge 30 are conducive to abrading lines of grout formed by adjacent aligned tiles. In such an arrangement, the length of the stroke of the reciprocating saw is not critical. Note that in this configuration, the rear end 32 of the blade 10 forms a clearance notch but that no stabilizing leg 60 is necessary, due to the speed of reciprocation of the spindle of a jigsaw or saber saw. Additionally, the need for a stabilizing leg 60 is minimized due to the relatively short distance "S" between the cutting edge 22 and the line of reciprocation. This relatively short distance is feasible due to the configuration of a jigsaw or saber saw and the mounting of the blade in a position such that the cutting surface faces forwardly when the saw is gripped in the usual fashion.

Each of the blades 10 has a cutting edge 22 spaced perpendicularly from the line of reciprocation 16 a sufficient distance S to permit clearance of the saw 10 with the work surface 40, as discussed above. Reciprocating saws are generally operated such that the saw is held in a position in which the spindle reciprocates perpendicularly to the line of travel of the saw as the blade moves through work surface. Accordingly, clearance of the saw structure with the work surface is rarely a problem. However, the present invention contemplates use of a reciprocating saw operated in a position such that the spindle reciprocates substantially parallel to the line of travel of the saw as seen in FIG. 5. Thus, the cutting edge must be distanced from the line of reciprocation 16 sufficiently to permit clearance of the lowest point 42 of the saw from the work surface. Moreover, it is desirable that the distance be sufficient to provide clearance of the saw as well as for hand holding the saw and maneuvering the saw.

In the case of reciprocating saws such as the Milwaukee® Sawzall® and the Bosch Sabre Plus®, this distance can be minimized by mounting the blade in an inverted position, such that the cutting edge 22 faces upwardly when the saw, seen in FIG. 5, is gripped in the usual position. With a reciprocating saw such as a jigsaw or saber saw, the blade need not be inverted to minimize the distance. See FIG. 7. Due to the structure of a jigsaw or saber saw, a distance "S" between the cutting edge 22 and the line of reciprocation 16 of at least about two inches is suitable, the distance from the line of reciprocation being measured perpendicularly therefrom. In the case of a Milwaukee® Sawzall® or the Bosch Sabre Plus®, a distance, "S", of at least about three inches is suitable. As the distance increases, the blade tends to become less stable during reciprocation, tending to cause damage to tiles adjacent the grout to be cut. Accordingly, inclusion of a stabilizing leg 60 is increasingly helpful as the distance "S" increases.

In any configuration, the cutting edge 22 may take any suitable form. In one embodiment, seen in FIG. 3, the cutting edge 22 has a toothed blade 66. However, in the preferred embodiment, the cutting edge 22 has an abrasive 64 joined to the blade, such as carbide steel granules. The body 18 of the blade is preferably constructed of steel material which provides for a rigid body and an inexpensive blade.

In another embodiment of the invention, the entire abrading blade is not a unitary piece as described above but rather is a blade assembly 80 including a blade body 18 with a removable cutting section 86 having a cutting edge 88. The removable cutting section feature allows for replacement of worn cutting sections and/or attachment of multiple or different cutting sections for cutting grout of various widths. The blade assembly has a configuration similar to the abrading blade described above but does not include a cutting edge. Rather, a removable cutting section is attachable to the blade body to form an abrading blade assembly.

Figure 8:
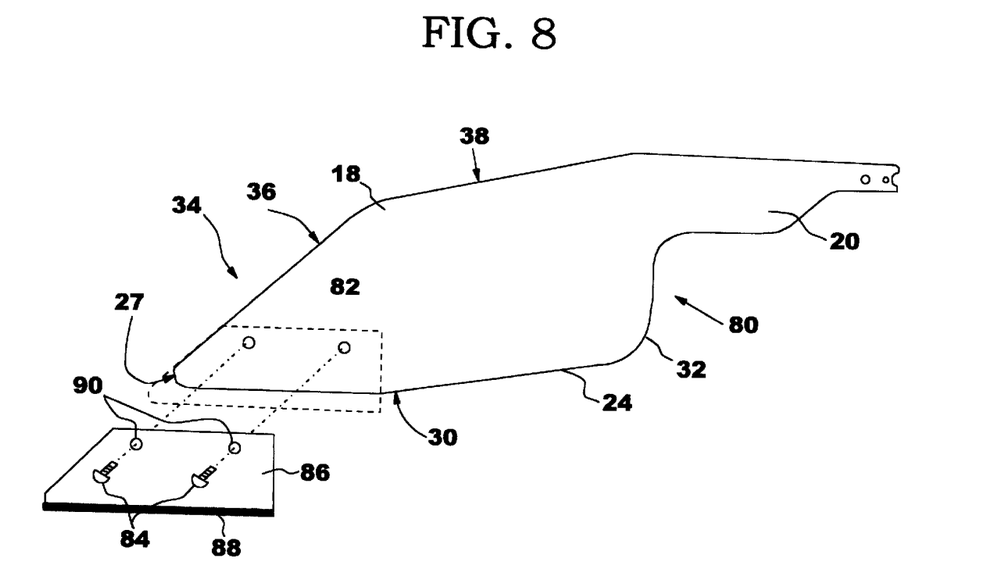
FIG. 8 is an elevational view of a blade holder having a detachable blade in accordance with the present invention for abrading grout between tiles showing a shank adapted for attachment to a jigsaw.

An example of a blade assembly 80 for attachment to a jigsaw is shown in FIG. 8. The blade assembly 80 is similar to the blade described above and has a rigid body 18, a shank portion 20, and a cutting section 86 removably attachable to the body 18. The body 18 has a lower end 24, a leading edge 27, a trailing edge 30, a rear end 32, a front end 34, a forward edge 36 and a top end 38. The blade body may optionally comprise a stabilizing leg similar to that shown in FIGS. 1–3 (not shown in FIGS. 8 and 9). The shank portion 20 may have any configuration suitable for attachment to a spindle of a reciprocating saw.

The body 18 of the blade assembly 80 includes means for attaching the cutting section 86. The attaching means may comprise openings, studs, bolts, pins, clips, or any other suitable means, the important feature being secure yet releasable means of mounting a cutting section 86.

In the example of FIG. 8, the cutting section 86 is attached using two openings 82 through the body 18 for receiving bolts 84. The openings may be threaded to engage the bolts or, alternatively, receive the bolts to be secured by nuts on the opposite side of the body. The openings are positioned such that the cutting edge 88 of the cutting section 86, when attached to the blade body 18, is oriented substantially parallel to the line of reciprocation of the spindle of the reciprocating saw when the blade holder is attached to a saw. Furthermore, as described above, the cutting section is positioned relative to the blade assembly 80 such that the cutting edge 88 is spaced perpendicularly from the line of reciprocation 16 a sufficient distance as to permit clearance of the saw with a work surface.

Figure 9:
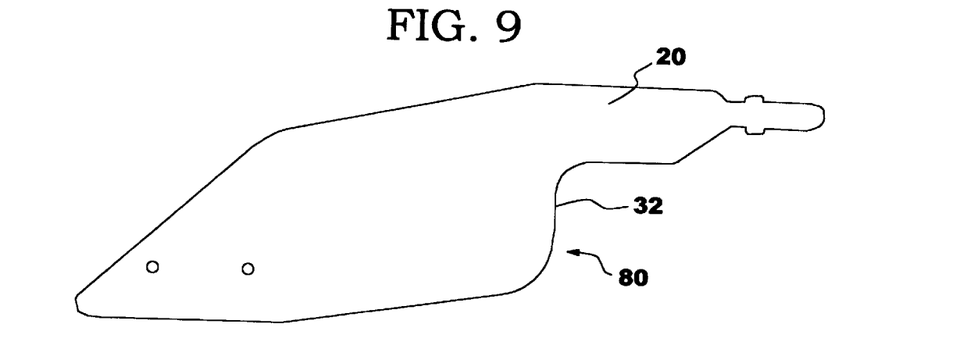
FIG. 9 is an elevational view of a blade holder in accordance with the present invention for abrading grout between tiles showing a shank adapted for inverted attachment to a Bosch Sabre Plus™ reciprocating saw.
Figure 10:
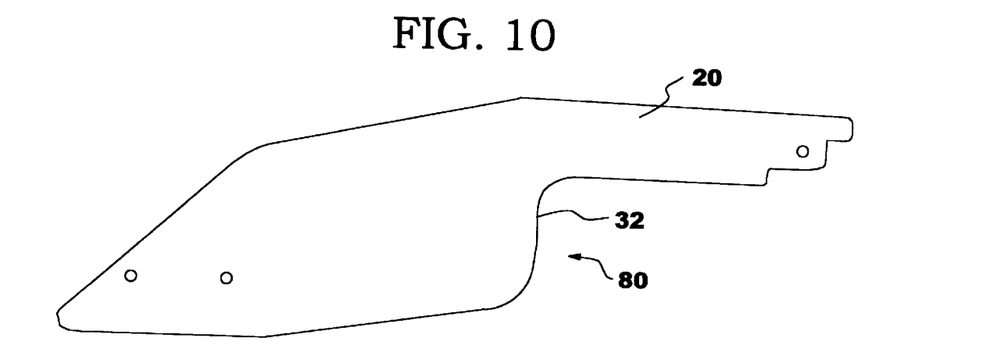

The shank portion 20 shown in FIG. 8 is configured for attachment to a jigsaw. FIG. 9 shows a blade assembly 80 having a shank portion 20 configured for attachment to a Bosch Sabre Plus™ saw as described above in reference to the shank shown in FIG. 2. FIG. 10 shows a blade assembly 80 having a shank portion 20 configured for attachment to a Milwaukee® Sawzall® saw as described above in reference to the shank shown in FIG. 1.

Figure 11:
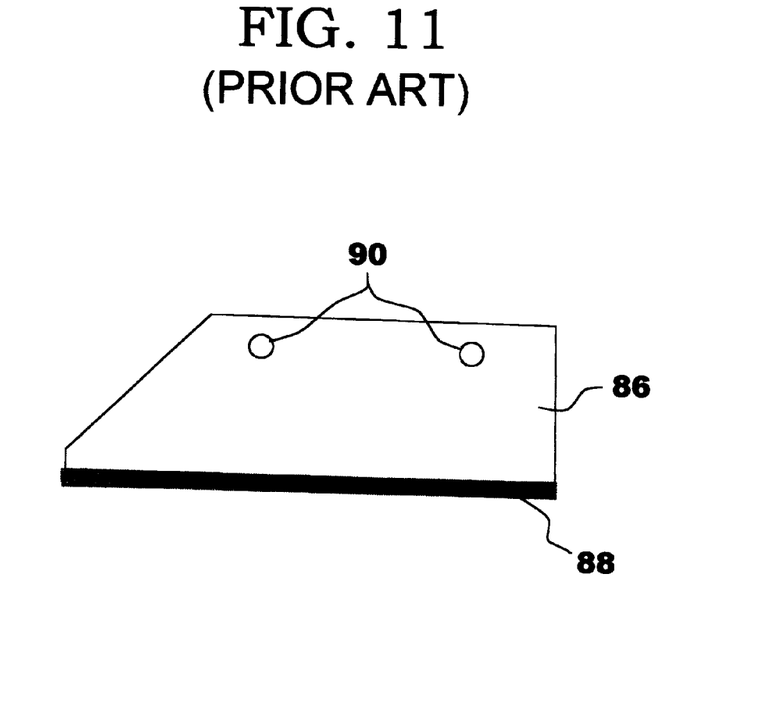
FIG. 11 is an elevational view of a prior art cutter having a carbide cutting edge for attachment to a blade holder in accordance with the present invention.
Figure 12:
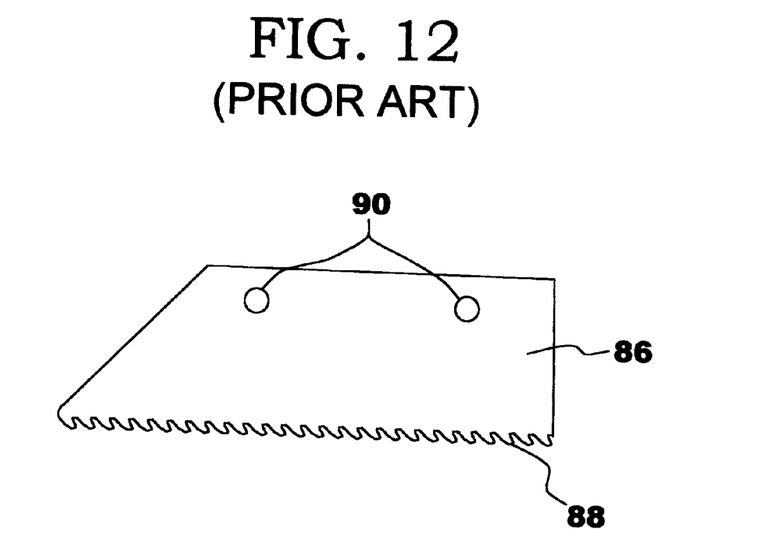
FIG. 12 is an elevational view of a prior art cutter having a serrated cutting edge for attachment to a blade holder in accordance with the present invention.

FIGS. 11 and 12 show cutting sections 86 having holes 90 as known in the prior art for use with a manually operated grout removal tool. FIG. 11 shows a cutting section 86 having a cutting edge 88 comprising carbide granules and FIG. 12 shows a similar cutting section 86 having a cutting edge 88 comprising serrated teeth. Suitable cutting sections are sold by Q.E.P. Co., Inc. under the designation QEP 10025.

In accordance with the present invention a single cutting section may be attached to a blade holder to remove narrow lines of grout, or multiple cutting sections may be attached to a blade holder to remove wider lines of grout.

Alternatively, cutting sections having wider cutting edges and/or a wide shoe forming a wider cutting edge, similar to that shown in FIG. 3, may be used.

Having thus described particular embodiments of the invention, various alterations, modifications, and improvements will readily occur to those skilled in the art. Such alterations, modifications and improvements as are made obvious by this disclosure are intended to be part of this description though not expressly stated herein, and are intended to be within the spirit and scope of the invention. Accordingly, the foregoing description is by way of example only, and not limiting. The invention is limited only as defined in the following claims and equivalents thereto.

What is claimed is:

1. A blade assembly for cutting a work surface, said blade assembly being attachable to a reciprocating saw having a reciprocable spindle, said blade assembly comprising:
   a rigid body having a lower end;
   a shank portion extending rearwardly from said body, said shank being configured for attachment to the spindle for reciprocation therewith; and
   a cutting section removably attachable to said body, said cutting section having a cutting edge for engaging the work surface, said cutting edge being spaced perpendicularly from said shank portion a distance sufficient to permit clearance of the saw from the work surface when said cutting section is attached to said body and said shank portion is attached to the spindle and when said cutting edge engages the work surface such that said shank portion is reciprocable substantially parallel to said work surface.

2. The blade assembly of claim 1, further comprising a cutting section attached to said body.

3. The blade assembly of claim 1, further comprising means for removably attaching said cutting section to said body.

4. The blade assembly of claim 3, wherein said means for removably attaching said cutting section comprises a pair of openings defined by said body for receiving fasteners for mounting said cutting section to said body.

5. The blade assembly of claim 4, wherein each opening of said pair of openings comprises threads for receiving a bolt.

6. The blade assembly of claim 3, wherein said means for removably attaching a cutting section comprises a pair of projections extending from said rigid body, said cutting section comprising a pair of openings for receiving said projections.

7. The blade assembly of claim 3, wherein said means for removably attaching said cutting section are positioned on said body to space said shank at least about two inches from said shank, measured perpendicularly therefrom, when said cutting section is attached to said body.

8. The blade assembly of claim 3, wherein said means for removably attaching a cutting section are positioned on said body to space said shank at least about 2.5 inches from said shank, measured perpendicularly therefrom, when said cutting section is attached to said body.

9. The blade assembly of claim 3, wherein said means for removably attaching a cutting section are positioned on said body to space said shank at least about three inches from said shank, measured perpendicularly therefrom, when said cutting section is attached to said body.

10. The blade assembly of claim 1, wherein said body further comprises a rear end having a notch to prevent interference of said body with the reciprocating saw when the blade assembly is reciprocated.

11. The blade assembly of claim 10, wherein said rear end further comprises a rearwardly extending stabilizing leg adjacent to said notch.

12. The blade assembly of claim 11, wherein said body comprises a leading end, and said body further comprises a forward edge receding rearward and upward from said leading end.

13. The blade assembly of claim 12, wherein said forward edge is substantially straight and forms an acute angle with said leading end.

14. The blade assembly of claim 13, wherein said shank is configured for attaching the blade assembly to the spindle of said saw in an inverted position.

15. The blade assembly of claim 10, wherein said cutting edge is less than one inch in length.

16. The blade assembly of claim 10, said body further comprising a trailing edge adjacent said means for removably attaching a cutting section, said trailing edge extending to said rear end and being inclined relative to said cutting edge when said cutting section is attached to said body.

17. The blade assembly of claim 1, wherein said cutting edge comprises cutting teeth.

18. The blade assembly of claim 1, wherein said cutting edge comprises an abrasive.

19. The blade assembly of claim 18, wherein said abrasive comprises carbide steel granules.

20. A cutting assembly for cutting a work surface, comprising:
    a reciprocating saw having a spindle reciprocable along a line of reciprocation;
    a rigid body having a lower end and a shank, said shank extending rearwardly from said body and being attached to said spindle for reciprocation therewith; and
    a cutting section removably attachable to said body, said cutting section having a cutting edge for engaging the work surface, said cutting edge being spaced perpendicularly from said line of reciprocation a distance sufficient to permit clearance of the saw from the work surface when said cutting section is attached to said blade body, said shank is attached to said spindle and said cutting edge engages the work surface such that said line of reciprocation is parallel to the work surface.

* * * * *